W. C. LEAVITT.
HANDLE FOR METALLIC VESSELS.
APPLICATION FILED SEPT. 6, 1919.

1,350,659. Patented Aug. 24, 1920.

INVENTOR:
WILLIAM C. LEAVITT
Per
WILLIAM W. GALLAGHER
ATTORNEY

UNITED STATES PATENT OFFICE.

WILLIAM C. LEAVITT, OF NORWAY, MAINE.

HANDLE FOR METALLIC VESSELS.

1,350,659. Specification of Letters Patent. Patented Aug. 24, 1920.

Application filed September 6, 1919. Serial No. 322,170.

*To all whom it may concern:*

Be it known that I, WILLIAM C. LEAVITT, a citizen of the United States, residing at Norway, in the county of Oxford and State of Maine, have invented a new and useful Handle for Metallic Vessels, of which the following is a specification.

My invention or improvement relates to the mode, manner, method and simplicity with which a handle may be attached to a metallic vessel, and the object of my improvement is to provide a handle which may be readily and easily attached to vessels of the nature mentioned, no soldering used in making the attachment.

I attain this object by a handle illustrated in the accompanying drawing, in which—

References hereinafter made are to Fig. 2, in the accompanying drawing.

That part of handle which rests against, or comes in direct contact with vessel to which handle is attached and makes up the extension from top of handle to base of same, is depicted as E, and F. E, is that part of the extension of handle which when handle is attached to vessel fits closely over the top of vessel and extends downward on the inside of same to a point below a small, short, bolt hereinafter mentioned. This part of the extension has a flat surface, with finished edges and a slight curve or downward sag at a point immediately preceding that part of the extension fitting closely over top of vessel. The downward curve or sag is to prevent handle swinging from side to side. The handle is made with or without the curve or sag mentioned and extension E, may fit against the outside of vessel as well as against the inside. It is desirable to so place it when a cover is to be used on the vessel.

The second or lower part of the extension of handle is depicted as F, and when attached to vessel extends downward on the outside of said vessel, from a point above the bolt herein and above mentioned, to base of handle. This part of the extension is also flat with finished edges and completes the extension from top of handle to base of same. It will be observed that the lower end of that part of the extension described as E, and the upper end of that part of the extension described as F, extend by each other, and as stated, E, may be on the inside of vessel or on the outside. When on the inside, the side of the vessel is between E and F. When on the outside of vessel the side of same does not come between E and F but a part of E and a part of F come in direct contact.

The small, short bolt mentioned above and depicted as B, when handle is attached to vessel, passes through part of extension herein first described and depicted as E, through vessel to which handle is attached and through part of extension described and depicted as F. When nut C, is turned into place the handle is firmly attached to vessel.

That part of handle which fits the hand, depicted as A, and extensions described as E, and F, is one continuous piece of metal formed as described above and separated only at a point in the extension as explained, namely: where the brim and side of the vessel may pass between E, and F.

Figure 1:
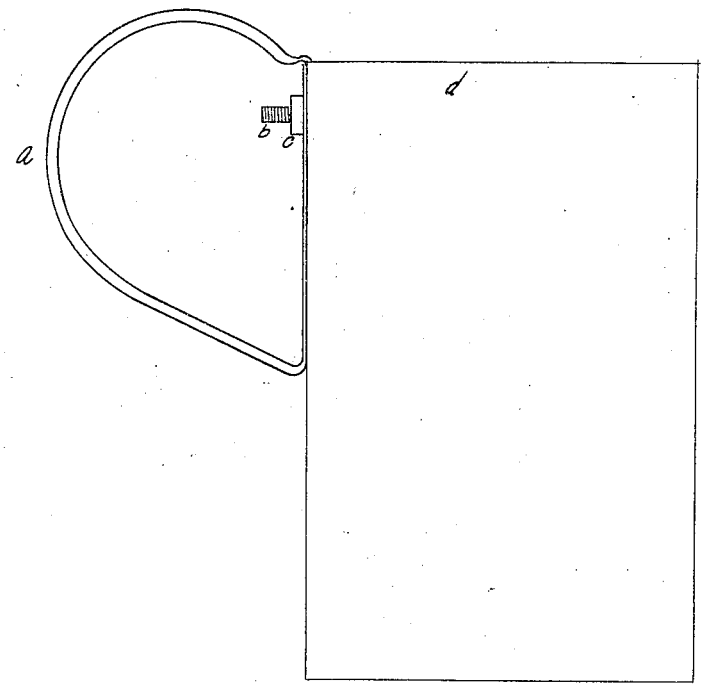
Figure 1, shows the handle attached to vessel.
Figure 2:
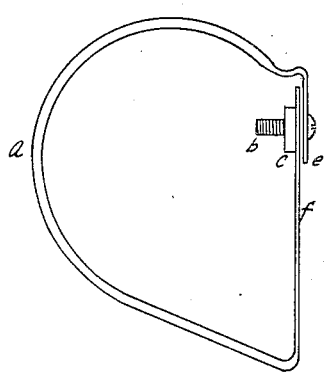
Fig. 2, shows the handle not attached to vessel.
Figure 3:
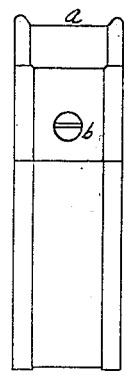
Fig. 3, shows that part of handle which when attached to vessel comes in direct contact therewith.

What admitted to be old:

That part of handle depicted as A, in Fig. 2 extending from base of handle to a point next preceding the sag or curve described above, or in other words, that part of handle which fits the hand.

I am aware that prior to my invention handles to be attached to metallic vessels have been made. I therefore do not claim my invention to be the only handle that may be attached to metallic vessels, but

I claim:

A handle for metallic vessels made of a strip of metal having a small hole through each of its two ends and so bent that in its bended form the two ends pass or extend by each other and the two holes are thus brought in registry, and means of attaching same to vessel by the use of a small bolt and nut: the bolt passing through the holes in the two ends described and vessel with nut turned into place firmly attaching handle to vessel, all substantially as described.

Signed at Norway, in the county of Oxford and State of Maine, July 9, 1920.

WILLIAM C. LEAVITT.